(12) United States Patent
Jacob

(10) Patent No.: US 11,697,546 B2
(45) Date of Patent: *Jul. 11, 2023

(54) BEVERAGE SYSTEMS AND KITS AND METHODS OF USING THE SAME

(71) Applicant: Brumate, Inc., Denver, CO (US)

(72) Inventor: Dylan M. Jacob, Denver, CO (US)

(73) Assignee: BruMate Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/875,041

(22) Filed: Jul. 27, 2022

(65) Prior Publication Data

US 2022/0356000 A1 Nov. 10, 2022

Related U.S. Application Data

(63) Continuation of application No. 16/667,638, filed on Oct. 29, 2019, now Pat. No. 11,414,258, which is a
(Continued)

(51) Int. Cl.
*B65D 81/38* (2006.01)
*B65D 43/02* (2006.01)
(Continued)

(52) U.S. Cl.
CPC ..... *B65D 81/3881* (2013.01); *A47G 23/0266* (2013.01); *A47J 41/0038* (2013.01); *B65D 43/0229* (2013.01); *B65D 47/06* (2013.01); *B65D 81/3876* (2013.01); *A47G 2023/0275* (2013.01); *B65D 2543/00046* (2013.01); *B65D 2543/0049* (2013.01)

(58) Field of Classification Search
CPC ............ B65D 81/3876; B65D 81/3881; B65D 81/3883; B65D 81/3886; B65D 43/0225; B65D 43/0229; B65D 47/00; B65D 47/04; B65D 47/06; A47G 23/02; A47G 23/0266
See application file for complete search history.

(56) References Cited

U.S. PATENT DOCUMENTS

| 4,989,415 A | 2/1991 | Lombness |
| 5,212,963 A | 5/1993 | McGinnis |

(Continued)

OTHER PUBLICATIONS

Non-Final Office Action dated Aug. 19, 2022 in U.S. Appl. No. 17/702,594, 23 pages.
(Continued)

*Primary Examiner* — Javier A Pagan
(74) *Attorney, Agent, or Firm* — Shook, Hardy & Bacon LLP

(57) ABSTRACT

Beverage systems and kits and methods of using the same. A beverage system of the present disclosure includes a container configured to retain a beverage, the container having an outer wall and an internal threaded section above a non-threaded inner wall section; a threaded gasket having a threaded portion and an outer curved profile, the threaded portion configured to engage the internal threaded section of the container when coupled thereto; and a lid having an extension portion extending from a cover portion, the extension portion having a seal positioned thereon, the seal configured to engage the non-threaded inner wall section of the container when coupled thereto.

20 Claims, 19 Drawing Sheets

Related U.S. Application Data continuation of application No. 16/018,609, filed on Jun. 26, 2018, now Pat. No. 10,457,471, which is a continuation of application No. 15/440,954, filed on Feb. 23, 2017, now Pat. No. 10,005,608.

(51) Int. Cl.
  *B65D 47/06* (2006.01)
  *A47G 23/02* (2006.01)
  *A47J 41/00* (2006.01)

(56) References Cited

U.S. PATENT DOCUMENTS

| | | | |
|---|---|---|---|
| D373,704 S | 7/1996 | Doxey | |
| D398,479 S | 7/1998 | Vultaggio et al. | |
| 5,904,267 A * | 5/1999 | Thompson | B65D 81/3879 220/23.91 |
| 6,145,685 A | 11/2000 | Dick | |
| 6,604,649 B1 | 8/2003 | Campi | |
| 6,626,326 B2 | 9/2003 | Murakami | |
| D534,762 S | 1/2007 | Gluck | |
| D551,984 S * | 10/2007 | La Kier | D9/538 |
| D591,556 S | 5/2009 | Fuller | |
| D635,019 S | 3/2011 | Goto et al. | |
| D675,066 S | 1/2013 | Conlin et al. | |
| D690,988 S | 10/2013 | Audette | |
| D707,087 S | 6/2014 | Joy | |
| D727,093 S | 4/2015 | Lapsker | |
| D732,968 S | 6/2015 | Heisner et al. | |
| D750,497 S | 3/2016 | Gibbs et al. | |
| D752,397 S | 3/2016 | Seiders et al. | |
| D761,618 S | 7/2016 | Lapsker | |
| D761,623 S | 7/2016 | Leimone | |
| D773,296 S | 12/2016 | Lynd et al. | |
| D775,495 S | 1/2017 | Boroski et al. | |
| 9,555,949 B1 | 1/2017 | French et al. | |
| D779,285 S | 2/2017 | Seiders et al. | |
| D779,891 S | 2/2017 | Seiders et al. | |
| D779,892 S | 2/2017 | Seiders et al. | |
| D780,530 S | 3/2017 | Seiders et al. | |
| D780,531 S | 3/2017 | Seiders et al. | |
| D780,532 S | 3/2017 | Seiders et al. | |
| D780,533 S | 3/2017 | Seiders et al. | |
| D786,025 S | 5/2017 | Seiders et al. | |
| D808,733 S | 1/2018 | Spivey et al. | |
| 10,030,903 B2 * | 7/2018 | Nguyen | F25D 3/08 |
| D826,003 S | 8/2018 | Seiders et al. | |
| D829,058 S | 9/2018 | Seiders et al. | |
| 10,124,942 B2 | 11/2018 | Seiders et al. | |
| D888,505 S | 6/2020 | Seiders et al. | |
| 10,835,067 B2 | 11/2020 | Rane et al. | |
| D920,746 S | 6/2021 | Seiders et al. | |
| 2002/0088810 A1 * | 7/2002 | Murakami | B65D 81/3881 220/739 |
| 2007/0138176 A1 | 6/2007 | Gawlick | |
| 2009/0071969 A1 | 3/2009 | Lopez | |
| 2013/0126369 A1 | 5/2013 | Gamelli | |
| 2014/0251938 A1 | 9/2014 | Rose et al. | |
| 2015/0128637 A1 | 5/2015 | Peters | |

OTHER PUBLICATIONS

Final Office Action dated Sep. 19, 2022 in U.S. Appl. No. 17/702,594, 21 pages.

"Yeti Coolers Rambler Colster | Yeti Coolers", Retrieved from Internet URL : https://web.archive.org/web/20150111085715/http://yeticoolers.com/colster, accessed on Dec. 6, 2022, pp. 2.

"Yeti Rambler Colster | J&H Tackle", Retrieved from Internet URL : https://www.youtube.com/watch?v=MdabRrLEn4A, accessed on Dec. 6, 2022, pp. 5.

"Reduce 4 in 1 Can Cooler—Insulated Slim Can Cooler and Beer Bottle Holder, 4 Hours Cold—The Drink Cooler For 12 oz Slim Cans, Regular Cans, Bottles Plus Mixed Drinks—Pink Cotton, Gloss", Amazon, Retrieved from Internet URL : https://www.amazon.com/Reduce-Can-Cooler-4-Stainless/dp/B08HDQ3SBZ, accessed on Dec. 6, 2022, pp. 9 (2020).

Notice of Allowance dated Oct. 27, 2022 in U.S. Appl. No. 17/702,594, 9 pages.

Non-Final Office Action dated Nov. 18, 2022 in U.S. Appl. No. 17/880,833, 20 pages.

Non-Final Office Action dated Nov. 8, 2022 in U.S. Appl. No. 17/875,029, 20 pages.

Non-Final Office Action dated Nov. 8, 2022 in U.S. Appl. No. 17/875,015, 22 pages.

Non-Final Office Action dated Jan. 31, 2023 in U.S. Appl. No. 17/984,840, 21 pages.

Notice of Allowance dated Feb. 16, 2023 in U.S. Appl. No. 17/880,833, 7 pages.

Notice of Allowance dated Feb. 23, 2023 in U.S. Appl. No. 17/875,029, 7 pages.

Notice of Allowance dated Feb. 16, 2023 in U.S. Appl. No. 17/875,015, 8 pages.

Notice of Allowance dated Apr. 6, 2023 in U.S. Appl. No. 17/880,833, 8 pages.

* cited by examiner

BEVERAGE SYSTEMS AND KITS AND METHODS OF USING THE SAME

PRIORITY

The present application is related to, claims the priority benefit of, and is a U.S. continuation patent application of, U.S. patent application Ser. No. 16/667,638, filed Oct. 29, 2019, which is related to, claims the priority benefit of, and is a U.S. continuation application of U.S. patent application Ser. No. 16/018,609, filed Jun. 26, 2018 and issued as U.S. Pat. No. 10,457,471 on Oct. 29, 2019, which is related to, claims the priority benefit of, and is a U.S. continuation patent application of, U.S. patent application Ser. No. 15/440,954, filed Feb. 23, 2017 and issued as U.S. Pat. No. 10,005,608 on Jun. 26, 2018. The contents of each of the aforementioned applications and patents are hereby incorporated into the present disclosure directly and by reference in their entirety.

BACKGROUND

Various beverage containers, such as those used to keep a hot beverage hot and a cold beverage cold, are currently available in the marketplace and are sold in various configurations. However, said containers typically include a container and a lid, such as a travel mug, but are not otherwise configured to hold a secondary beverage container therein, such as a can of a beverage. Various "koozies" are also available in the marketplace, which are generally flexible and surround the bottom and most of the sides of a beverage can. Said koozies do not use a lid, and do not otherwise utilize any other compatible parts.

In view of the foregoing, a beverage system, configured to retain a beverage within a can and a beverage not within a can, with various lids and/or gaskets, and additional adapters to help keep the beverage cold, would be well received in the marketplace.

BRIEF SUMMARY

The present disclosure includes disclosure of a beverage system, comprising a container configured to retain a beverage, the container having an outer wall and an internal threaded section above a non-threaded inner wall section; a threaded gasket having a threaded portion and an outer curved profile, the threaded portion configured to engage the internal threaded section of the container when coupled thereto; and a lid having an extension portion extending from a cover portion, the extension portion having a seal positioned thereon, the seal configured to engage the non-threaded inner wall section of the container when coupled thereto.

The present disclosure includes disclosure of a beverage system, wherein the non-threaded inner wall section extends inward toward a relative center of the container further than the internal threaded section of the container.

The present disclosure includes disclosure of a beverage system, wherein when the lid is coupled to the container, the seal of the extension portion of the lid engages the non-threaded inner wall section below the internal threaded section of the container.

The present disclosure includes disclosure of a beverage system, wherein the container is sized and shaped so that a 16 oz. beverage can fits within the container and contacts the threaded gasket when the threaded gasket is coupled to the container.

The present disclosure includes disclosure of a beverage system, further comprising an adapter having a circumferential outer wall extending from a relative top to a relative bottom of the adapter, wherein the adapter is configured to fit within the container and rest at or near a relative bottom of the container.

The present disclosure includes disclosure of a beverage system, wherein the container is sized and shaped so that a 12 oz. beverage can fits within the container and contacts the threaded gasket when the adapter is positioned within the container and when the threaded gasket is coupled to the container.

The present disclosure includes disclosure of a beverage system, wherein the adapter defines a circumferential recessed portion at the relative top of the adapter and further defines a central dome at a relative center of the adapter.

The present disclosure includes disclosure of a beverage system, wherein the circumferential recessed portion and the central dome of the adapter are configured so to generally receive a bottom portion of a beverage can such that a bottom perimeter ring of the beverage can fits within the circumferential recessed portion of the adapter.

The present disclosure includes disclosure of a beverage system, wherein the adapter contains a temperature-sensitive material therein, the temperature-sensitive material selected from the group consisting of a metal and a liquid.

The present disclosure includes disclosure of a beverage system, wherein the outer curved profile of the gasket extends from a relative top of the threaded gasket to a relative side of the threaded gasket.

The present disclosure includes disclosure of a beverage system, wherein the lid has at least one aperture defined therein and at least one aperture cover coupled thereto, the at least one aperture cover configured to cover the aperture.

The present disclosure includes disclosure of a beverage system, wherein the container is vacuum sealed between the outer wall and the non-threaded inner wall section.

The present disclosure includes disclosure of a beverage system, wherein the outer wall of the container portion defines a grip portion thereon or therein, the grip portion comprising at least one recessed portion and at least one transition portion adjacent thereto.

The present disclosure includes disclosure of a beverage system, comprising a container configured to retain a beverage, the container having an outer wall and an internal threaded section above a non-threaded inner wall section, wherein the non-threaded inner wall section extends inward toward a relative center of the container further than the internal threaded section of the container; a threaded gasket having a threaded portion and an outer curved profile, the threaded portion configured to engage the internal threaded section of the container when coupled thereto; a lid having an extension portion extending from a cover portion, the extension portion having a seal positioned thereon, the seal configured to engage the non-threaded inner wall section of the container when coupled thereto; and an adapter having a circumferential outer wall extending from a relative top to a relative bottom of the adapter, wherein the adapter is configured to fit within the container and rest at or near a relative bottom of the container.

The present disclosure includes disclosure of a beverage system, wherein the container is sized and shaped so that a 16 oz. beverage can fits within the container and contacts the threaded gasket when the threaded gasket is coupled to the container, and wherein the container is sized and shaped so that a 12 oz. beverage can fits within the container when the adapter is positioned within the container and contacts the threaded gasket and when the threaded gasket is coupled to the container.

The present disclosure includes disclosure of a beverage system, wherein the adapter defines a circumferential recessed portion at the relative top of the adapter and further defines a central dome at a relative center of the adapter, and wherein the circumferential recessed portion and the central dome of the adapter are configured so to generally receive a bottom portion of a beverage can such that a bottom perimeter ring of the beverage can fits within the circumferential recessed portion of the adapter.

The present disclosure includes disclosure of a beverage system, wherein the adapter contains a temperature-sensitive material therein, the temperature-sensitive material selected from the group consisting of a metal and a liquid.

The present disclosure includes disclosure of a beverage system, comprising a container configured to retain a beverage, the container having an outer wall and an internal threaded section above a non-threaded inner wall section, wherein the non-threaded inner wall section extends inward toward a relative center of the container further than the internal threaded section of the container; a threaded gasket having a threaded portion and an outer curved profile, the threaded portion configured to engage the internal threaded section of the container when coupled thereto; a lid having an extension portion extending from a cover portion, the extension portion having a seal positioned thereon, the seal configured to engage the non-threaded inner wall section of the container below the internal threaded section of the container when coupled thereto; and an adapter having a circumferential outer wall extending from a relative top to a relative bottom of the adapter, wherein the adapter is configured to fit within the container and rest at or near a relative bottom of the container; wherein the container is sized and shaped so that a 16 oz. beverage can fits within the container and contacts the threaded gasket when the threaded gasket is coupled to the container, and wherein the container is sized and shaped so that a 12 oz. beverage can fits within the container when the adapter is positioned within the container and contacts the threaded gasket and when the threaded gasket is coupled to the container.

The present disclosure includes disclosure of a beverage system, wherein the outer curved profile of the gasket extends from a relative top of the threaded gasket to a relative side of the threaded gasket.

The present disclosure includes disclosure of a beverage system, wherein the outer wall of the container portion defines a grip portion thereon or therein, the grip portion comprising at least one recessed portion and at least one transition portion adjacent thereto.

The present disclosure includes disclosure of various beverage systems, and shown and/or described herein.

The present disclosure includes disclosure of various beverage containers, and shown and/or described herein.

The present disclosure includes disclosure of various lids for beverage containers, and shown and/or described herein.

The present disclosure includes disclosure of various threaded gaskets for beverage containers, and shown and/or described herein.

The present disclosure includes disclosure of various adapters for use with beverage containers or beverage systems, and shown and/or described herein.

The present disclosure includes disclosure of various kits, and shown and/or described herein.

BRIEF DESCRIPTION OF THE DRAWINGS

The disclosed embodiments and other features, advantages, and disclosures contained herein, and the matter of attaining them, will become apparent and the present disclosure will be better understood by reference to the following description of various exemplary embodiments of the present disclosure taken in conjunction with the accompanying drawings, wherein.

Figure 1:
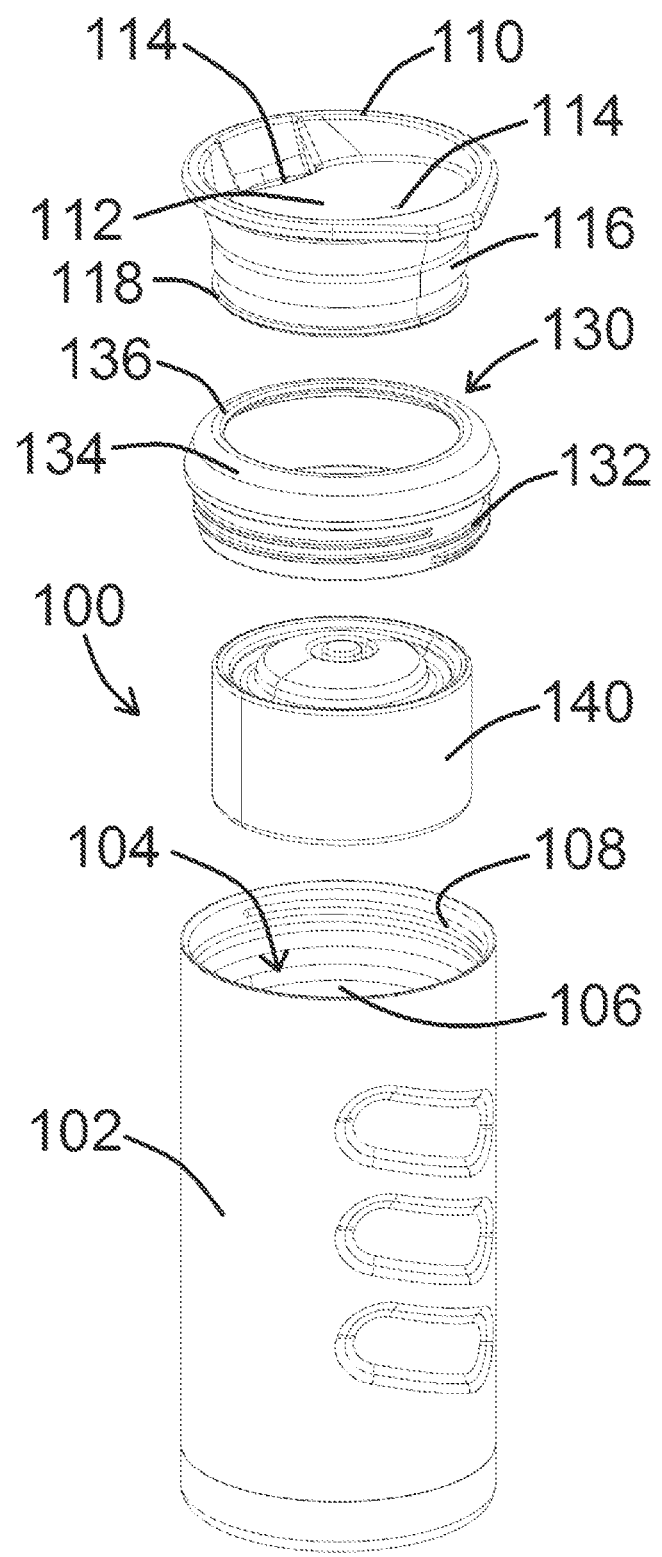
FIG. 1 shows a perspective exploded view of portions of a system, according to an exemplary embodiment of the present disclosure.

An overview of the features, functions and/or configurations of the components depicted in the various figures will now be presented. It should be appreciated that not all of the features of the components of the figures are necessarily described. Some of these non-discussed features, such as various couplers, etc., as well as discussed features are inherent from the figures themselves. Other non-discussed features may be inherent in component geometry and/or configuration.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

The present disclosure includes disclosure of beverage system embodiments, such as shown in FIG. 1. As shown in FIG. 1, an exemplary beverage system 100 of the present disclosure comprises a beverage container 102 configured to retain a beverage (a liquid) therein. Beverage systems 100 of the present disclosure also comprise/include a lid 110, such as shown in FIG. 1, whereby container 102 and lid 110 are configured to engage one another so to generally cover an opening 104 of container 102. Lids 110, as referenced herein, comprise a cover portion 112 configured to generally cover opening 104 of container 102, and have one or more cover apertures 114 defined therethrough, so that when a user wishes to drink a beverage within container 102 having a lid 110 positioned thereon, the beverage can flow from within container 102 and out of the one or more apertures 114 defined within lid 110.

Lid 110, as shown in FIG. 1, comprises an extension portion 116 generally extending away from cover portion 112, so that extension portion 116 can fit into opening 104 of container 102. Extension portion 116 can comprise a seal 118, such as a flexible rubber seal 118 or other flexible seal 118, so that when extension portion 116 is positioned into opening 104 and into container 102, flexible seal 118 of extension portion 116 contacts a non-threaded portion of inner wall section 106 of and inside container 102.

Exemplary system 100 embodiments of the present disclosure may also comprise/include a threaded gasket 130, such as shown in FIG. 1. As shown therein, threaded gasket 130 comprises a threaded portion 132, configured to engage an internal threaded section 108 of container 102. Threaded gaskets 130 may comprise a compliant material, such as a rubber or other polymeric material, as may be desired, or may be relatively hard, such as a hard plastic or metal material. Threaded gaskets 130, such as shown in FIG. 1, may also comprise/define a curved profile 134, extending along a portion of threaded gasket 130 from a relative top to a relative side of said threaded gasket 130, or transitioning from a relative top to a relative side of said threaded gasket 130.

Exemplary system 100 embodiments of the present disclosure may comprise/include an adapter 140, such as shown in FIG. 1. Adapter 140, such as shown in FIG. 1, is configured to fit within opening of container 102 and rest inside container 102 at the bottom of container 102.

Containers 102 of the present disclosure are configured to alternatively engage a) an exemplary lid 110, such that flexible seal 118 of extension portion 116 can engage non-threaded inner wall section 106 of and inside container, and b) an exemplary threaded gasket 130, such that threaded portion 132 of threaded gasket 130 can engage internal threaded section 108 of container 102.

Figure 2:
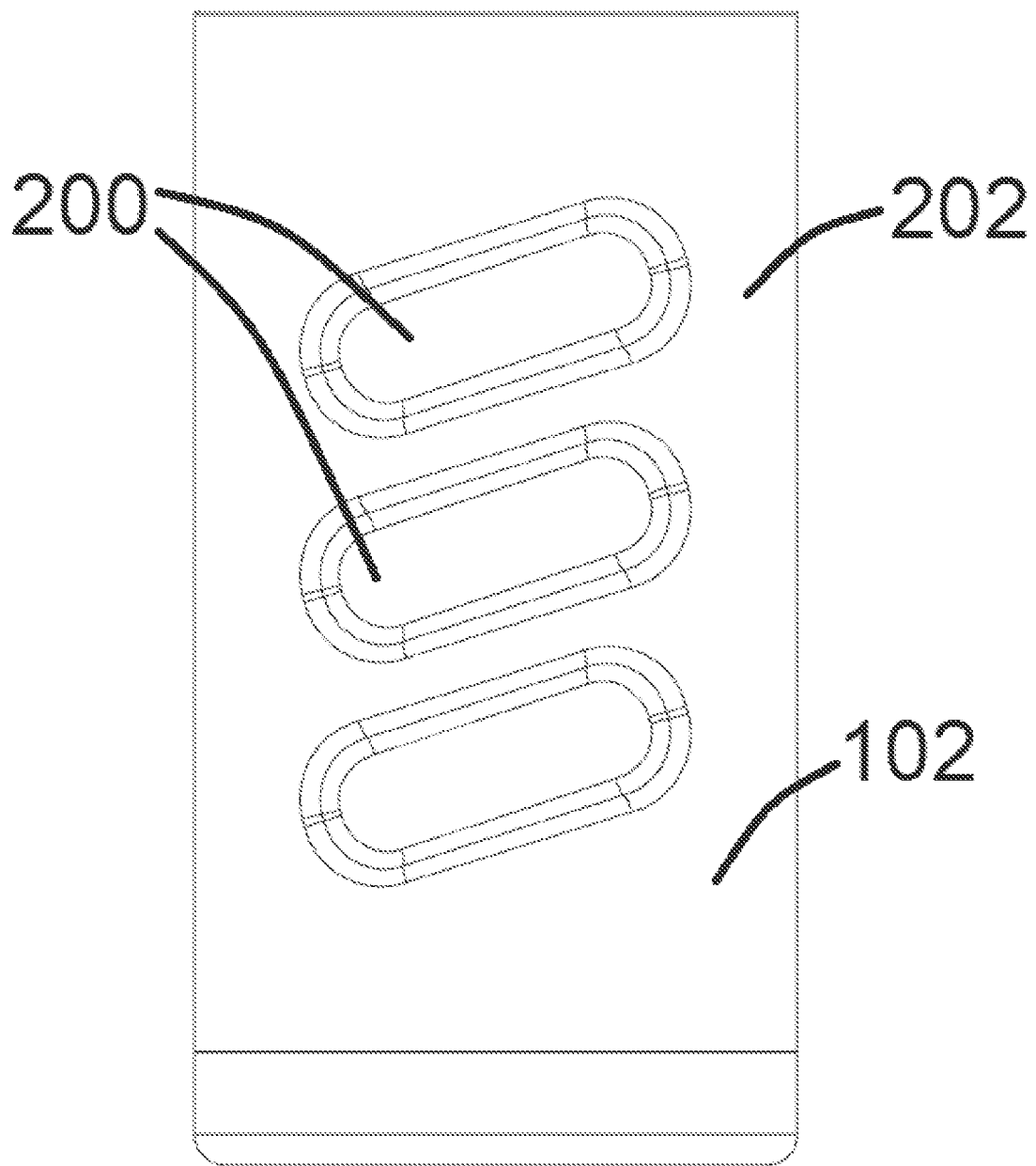
FIGS. 2, 3, 4, and 5 show relative side views of a container, according to exemplary embodiments of the present disclosure.
Figure 3:
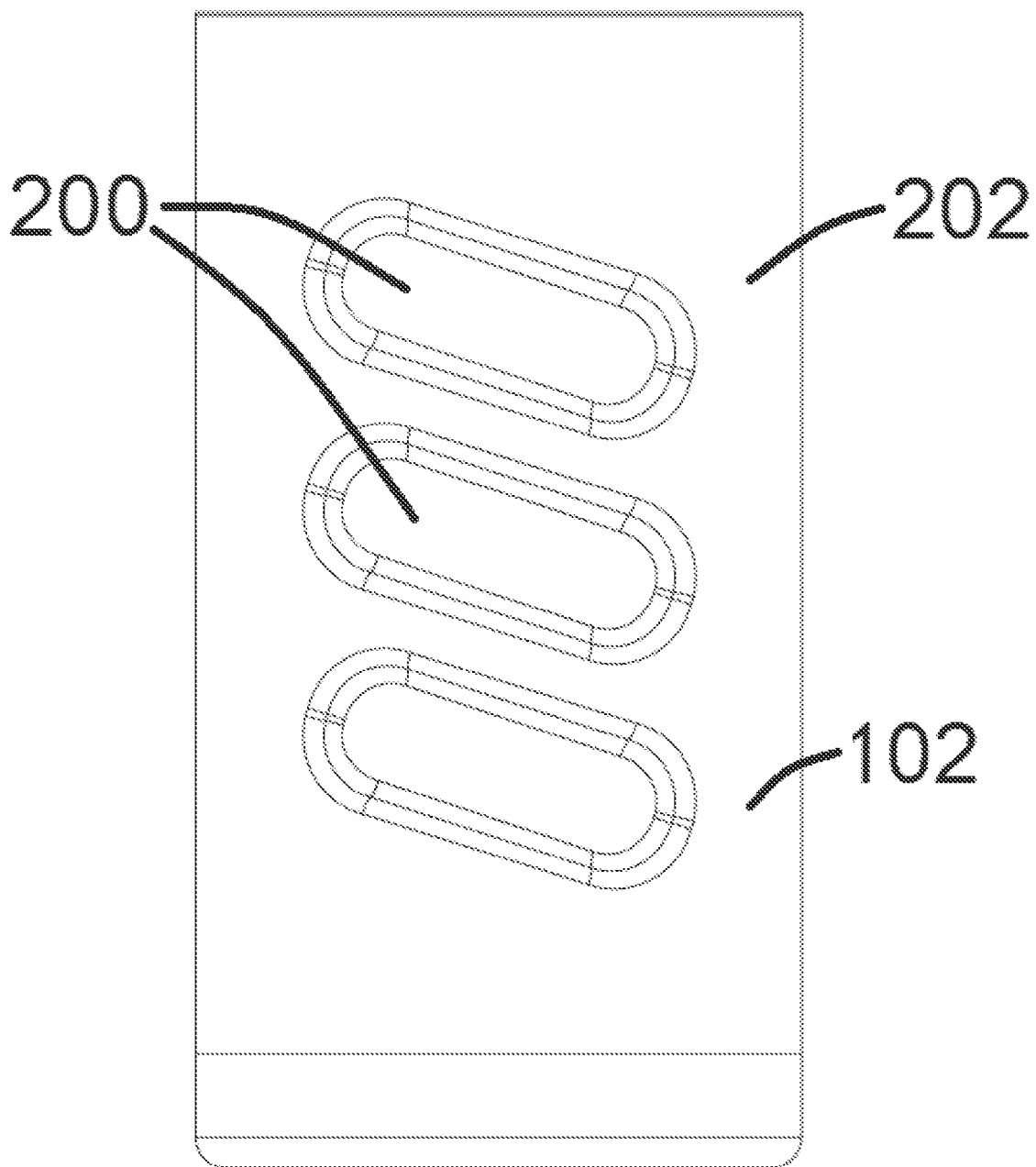

FIGS. 2 and 3 show opposite relative side views of an exemplary container 102 of the present disclosure. As shown therein, containers 102 of the present disclosure may comprise one or more grips 200, which may be generally recessed into an outer wall 202 of container (such as shown in FIGS. 2 and 3), may comprise a different material than other parts of containers 102, may protrude from outer wall 202 of container 102, etc., so to generally improve or otherwise facilitate gripping container 102. Any number of grips 200, such as one, two, three (such as shown in FIGS. 2 and 3, on each relative side of container 102), four, five, six (such as shown in FIGS. 2 and 3, cumulatively), or more, may be present on one or more portions of container 102.

Figure 4:
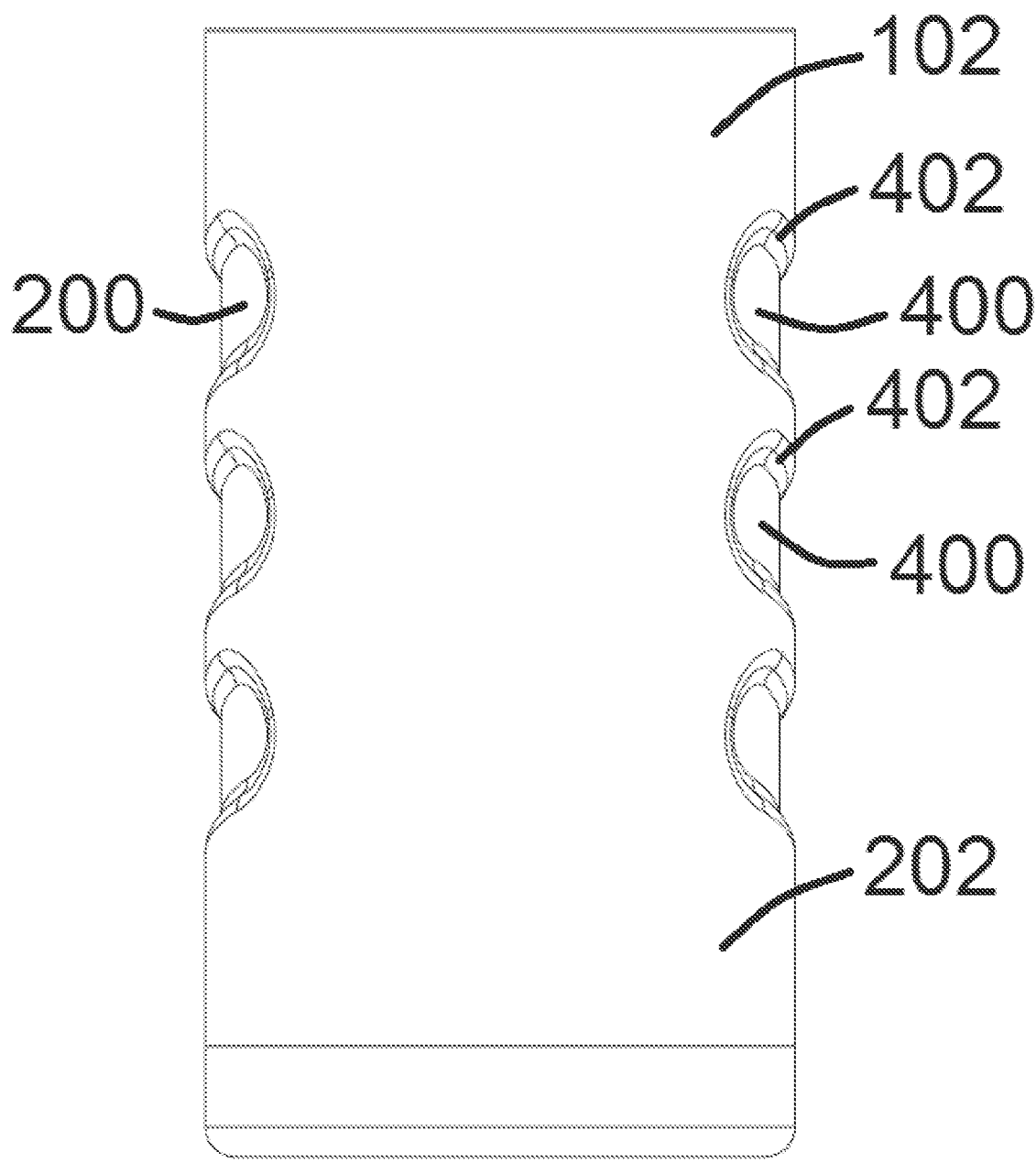
Figure 5:
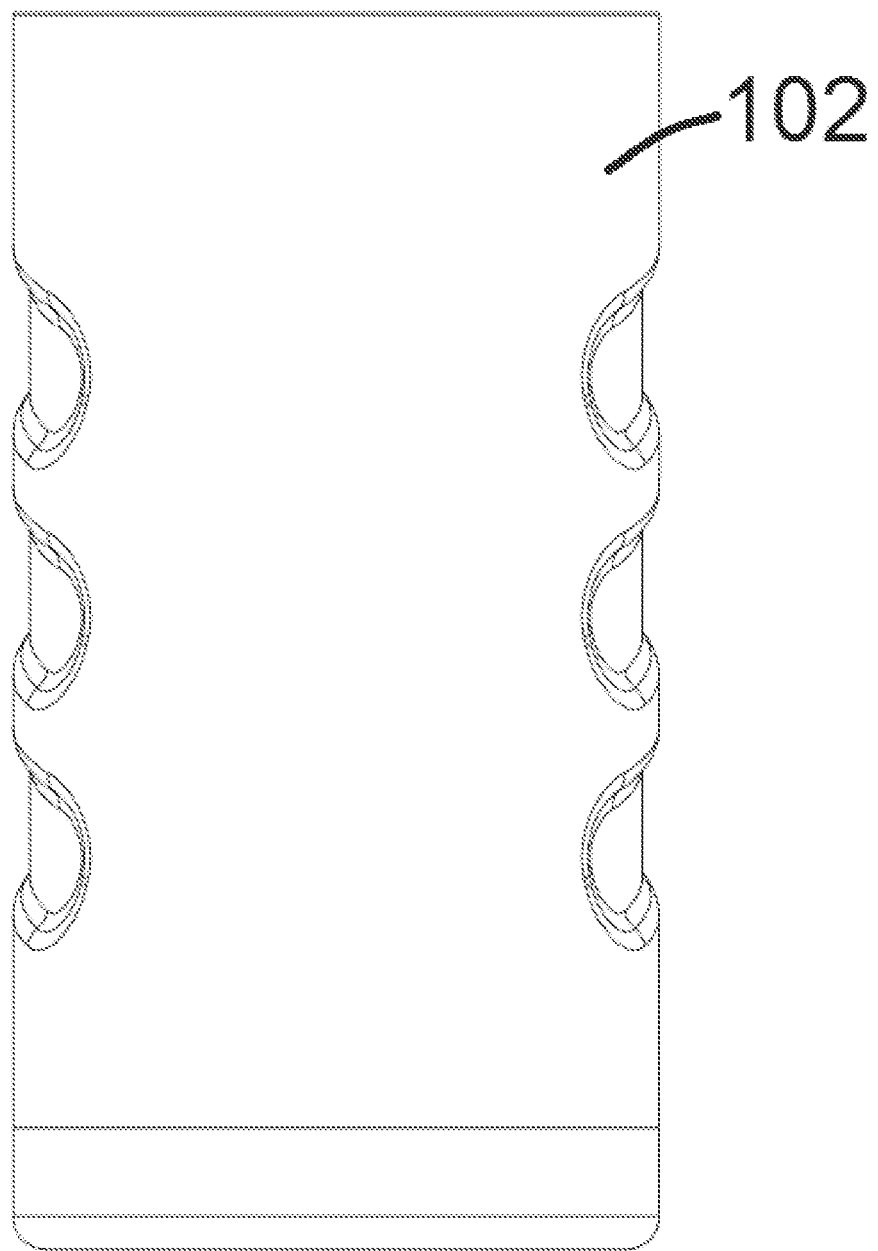

FIGS. 4 and 5 also show opposite side views of an exemplary container 102 of the present disclosure, 90° from the views shown in FIGS. 2 and 3, respectively. FIGS. 2, 3, 4, and 5 show relative "side" views of container 102 90° from one another, such as in the order of FIGS. 2, 4, 3, and 5, when container 102 is rotated in a clockwise fashion. As shown in FIGS. 4 and 5, grips 200 of container 102 are recessed, as identified by recessed portions 400 and transition portions 402, whereby transition portions 402 extend from recessed portions to outer wall 202 of container 102.

Figure 6:
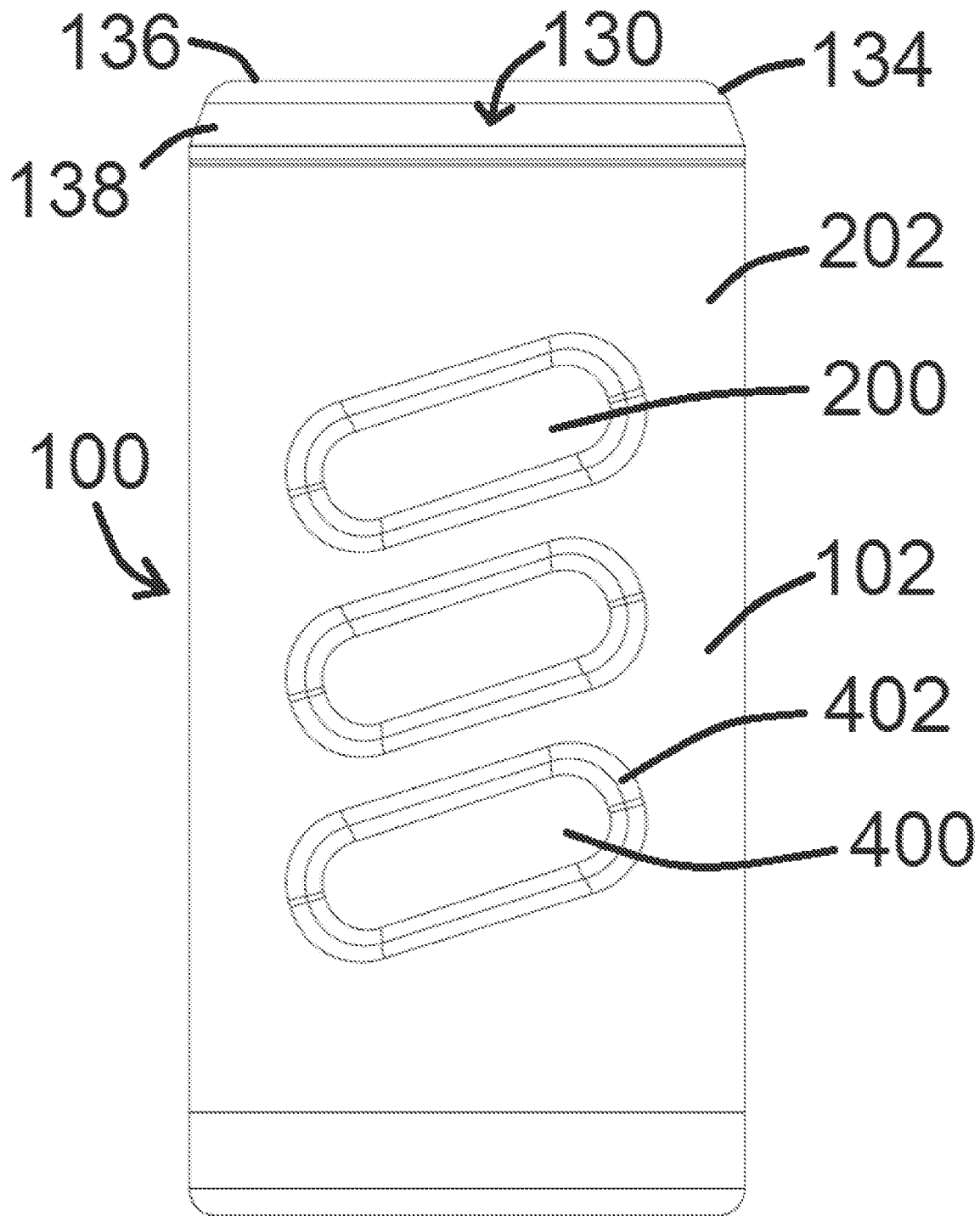
FIG. 6 shows a relative side view of a container with a threaded gasket coupled thereto, according to an exemplary embodiment of the present disclosure.
Figure 21:
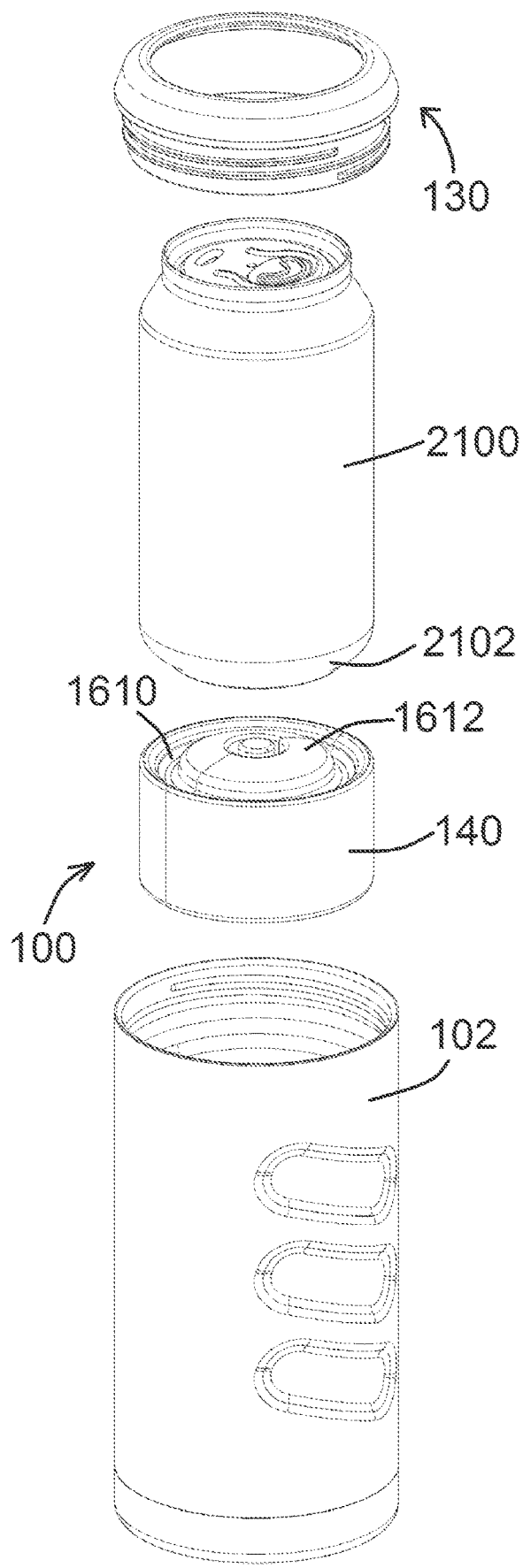
FIG. 21 shows a perspective exploded view of portions of a system having an adapter, according to an exemplary embodiment of the present disclosure.

FIG. 6 shows a relative side view of an exemplary system 100 of the present disclosure, comprising a container 102 with a threaded gasket 130 positioned at least partially therein (so that threaded portion 132 of threaded gasket 130 engages internal threaded section 108 of container 102). When threaded gasket 130 engages container 102, such as shown in FIG. 6, container 102 can be used as a beverage cup, whereby the user's or drinker's mouth would contact portions of threaded gasket 130 and perhaps portions of outer wall 202 of container 102. Threaded gaskets 130, such as shown in FIG. 6, may also comprise/define a curved profile 134, extending along a portion of threaded gasket 130 from a relative top 136 to a relative side 138 of said threaded gasket 130, or transitioning from a relative top 136 to a relative side 138 of said threaded gasket 130. Such a configuration of a threaded gasket 130 would make drinking from container 102 more desirable, versus drinking from a container having a relatively sharp edge at opening 104. A beverage can be placed directly within container 102, or a beverage can 2100 (as shown in FIG. 21 and described in further detail herein) can be placed inside container 102, while threaded gasket 130 is coupled to container 102.

Figure 7:
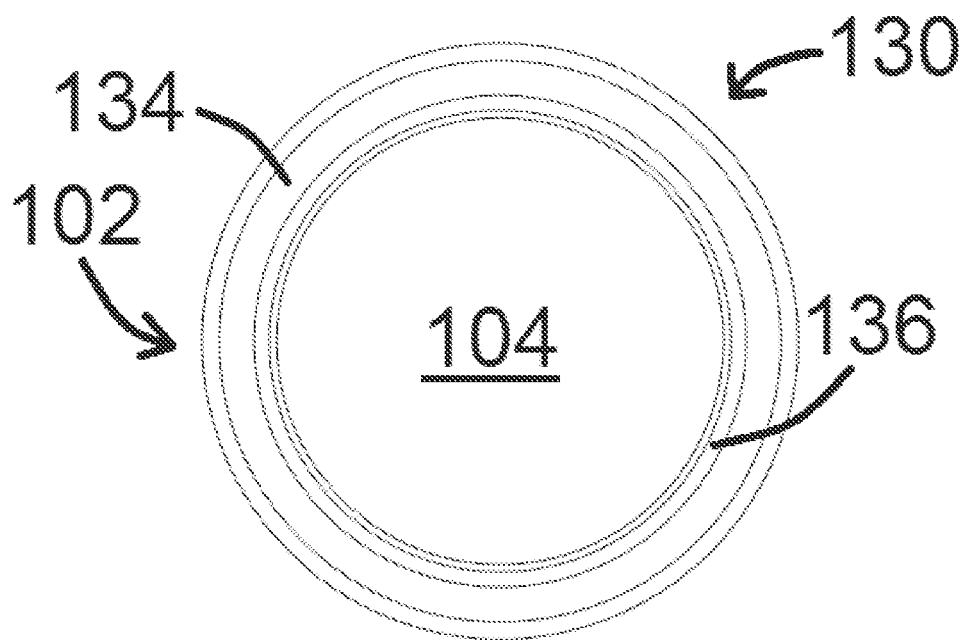
FIG. 7 shows a top view of a container with a threaded gasket coupled thereto, according to an exemplary embodiment of the present disclosure.
Figure 8:
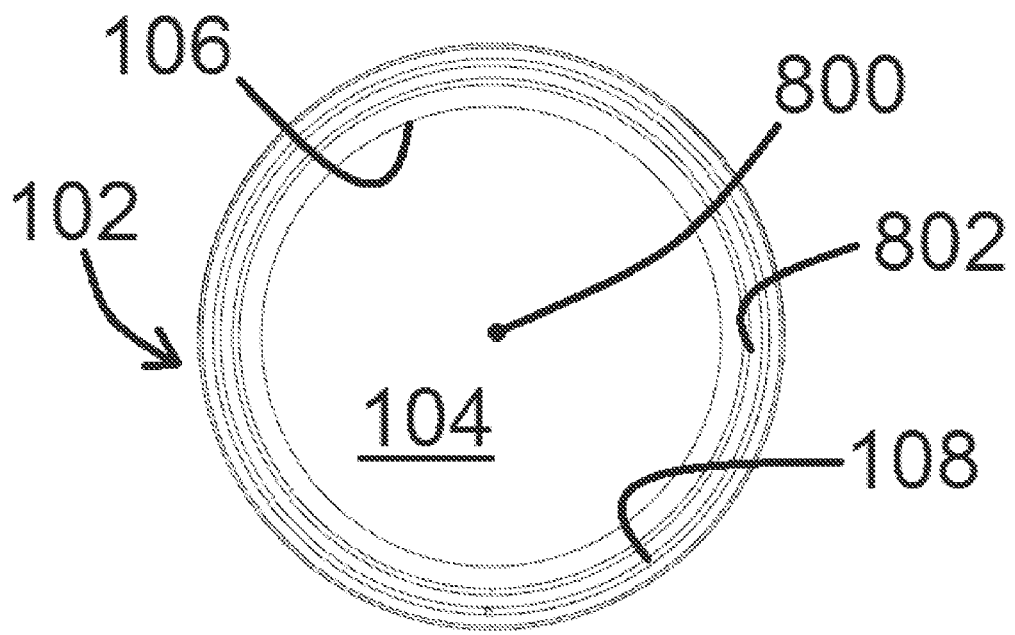
FIG. 8 shows a top view of a container without a threaded gasket coupled thereto, according to an exemplary embodiment of the present disclosure.

FIG. 7 shows a top view of an exemplary container 102 having a threaded gasket 130 positioned thereon, while FIG. 8 shows a top view of an exemplary container 102 without threaded gasket 130 positioned thereon. As shown in FIG. 7, curved profile 134 and relative top 136 of threaded gasket 130 can readily be seen, allowing most, if not all, of opening 104 to remain accessible when threaded gasket 130 is coupled to container 102. As shown in FIG. 8, internal threaded section 108 and non-threaded inner wall section 106 of container 102 can be readily seen, whereby non-threaded inner wall section 106 extends inward toward a relative center 800 of container 102 further than internal threaded section 108 of container 102. Such a configuration allows, for example, threaded portion 132 of threaded gasket 130 to couple to internal threaded section 108 of container 102, and also allows seal 118 of extension portion 116 of lid 110 to contact non-threaded inner wall section 106 when positioned therein (whereby threaded gasket 130 and lid 110 can be used interchangeably, as may be desired).

Containers 102 of the present disclosure are configured to keep a cold/cool beverage cold/cool, and are configured to keep a hot/warm beverage hot/warm, for an extended period of time. Said containers 102 are configured so that an enclosed space 802 exists within container 102, enclosed by at least portions of outer wall 202 and inner wall section 106. Said enclosed space 802, in various container embodiments, is vacuum sealed. In other container embodiments, enclosed space 802 can contain a liquid (such as a temperature-sensitive material 1902) and/or a gas, whereby said liquid and/or gas within enclosed space 802 insulates a beverage within container 102 from an environment outside of said container 102.

Figure 9:
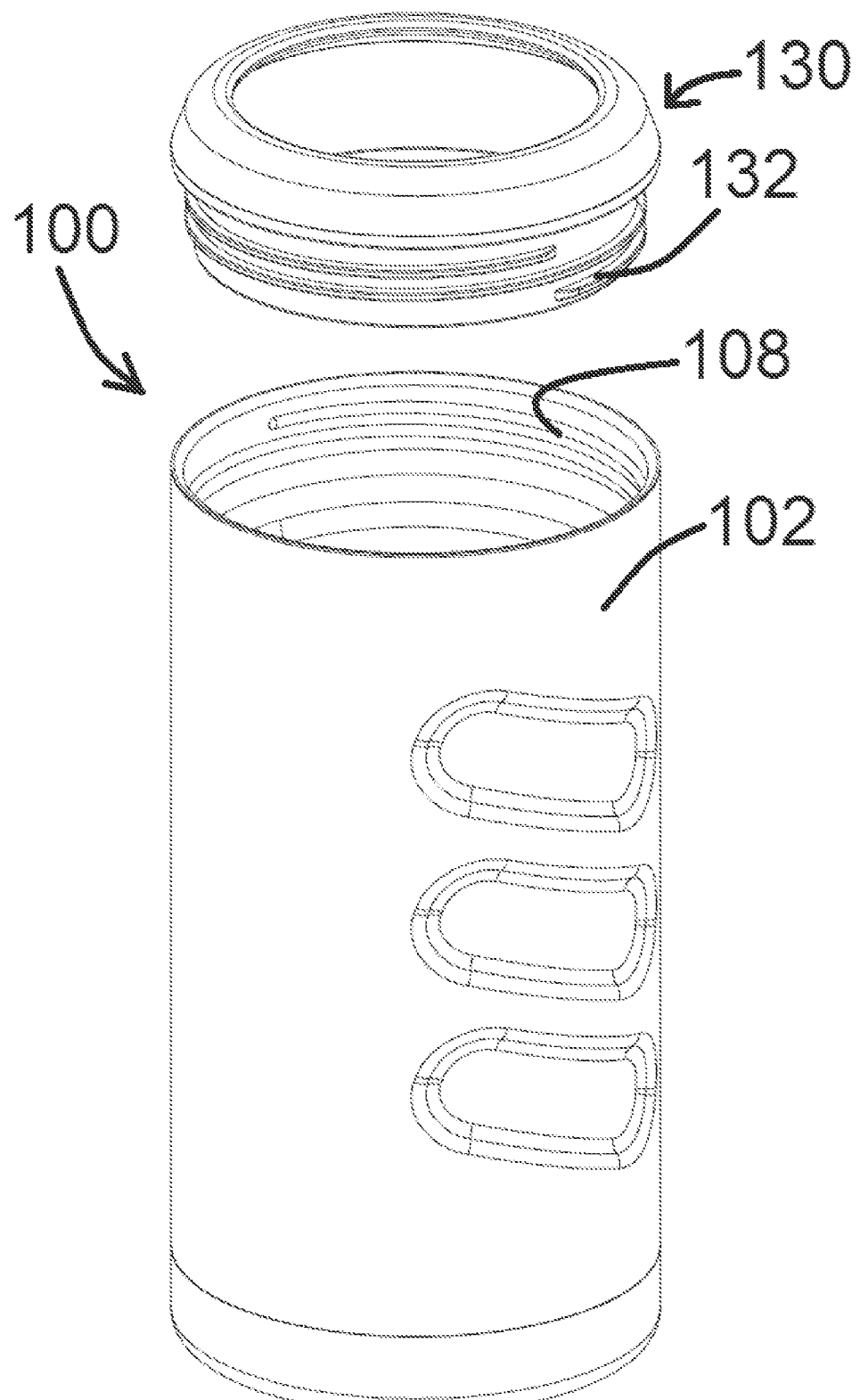
FIG. 9 shows a perspective exploded view of portions of a system, according to an exemplary embodiment of the present disclosure.
Figure 10:
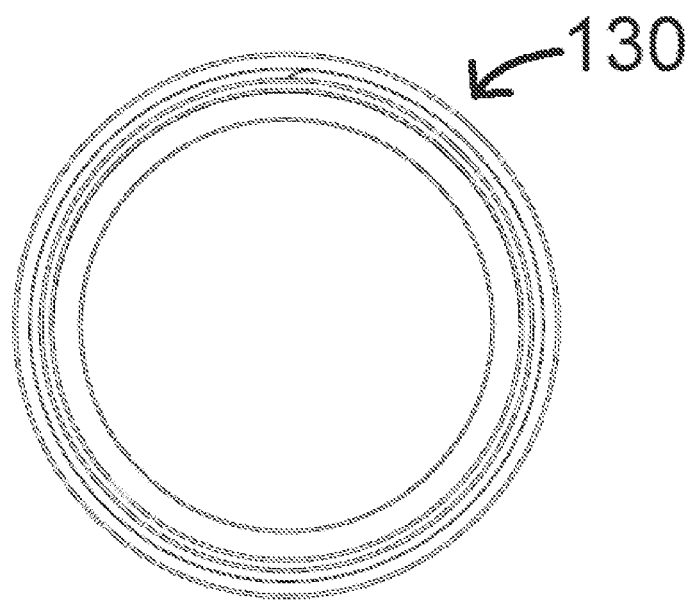
FIG. 10 shows a bottom view of a threaded gasket, according to an exemplary embodiment of the present disclosure.
Figure 11:
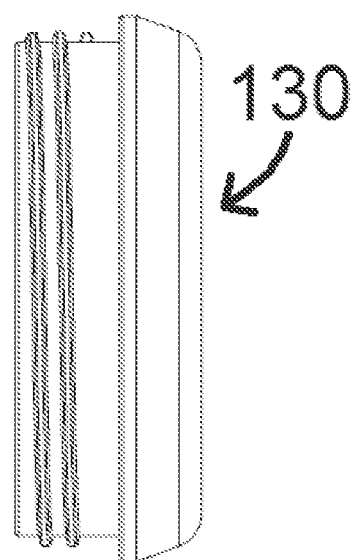
FIG. 11 shows a side view of a threaded gasket, according to an exemplary embodiment of the present disclosure.

FIG. 9 shows a perspective exploded view of portions of a system 100, namely a container 102 and a threaded gasket 130, whereby internal threaded section 108 of container 102 and threaded portion 132 of threaded gasket 130 can be readily seen. Threaded gasket 130 can be positioned upon and rotated relative to container 102 so to tighten or remove threaded gasket 130 relative to container 102. FIG. 10 shows a bottom view, and FIG. 11 shows a side view, of an exemplary threaded gasket 130 of the present disclosure, whereby threaded portions 132 can be readily seen.

Figure 12:
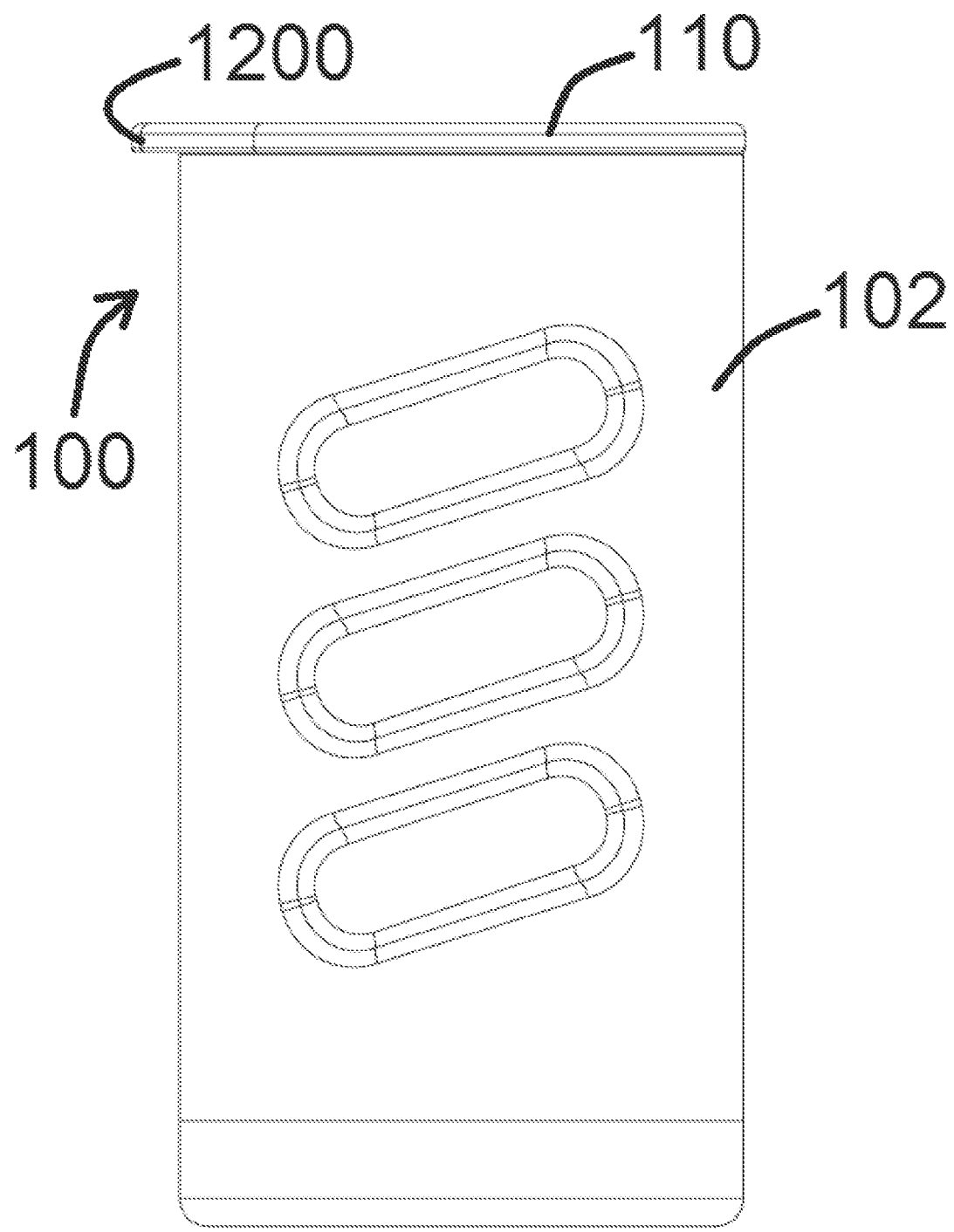
FIGS. 12 and 13 show relative side views of containers with a lid coupled thereto, according to an exemplary embodiment of the present disclosure.

FIG. 12 shows a relative side view of an exemplary system 100 of the present disclosure, comprising a container 102 with a lid 110 positioned at least partially therein (so that seal 118 of extension portion 116, such as shown in FIG. 1 for example, of lid 110 engages inner wall section 106 of container 102). When seal 118 of extension portion of lid 110 engages container 102, such as shown in FIG. 12, container 102 can be used as a beverage cup, whereby the user's or drinker's mouth would contact portions of lid 110 and perhaps portions of outer wall 202 of container 102.

Figure 13:
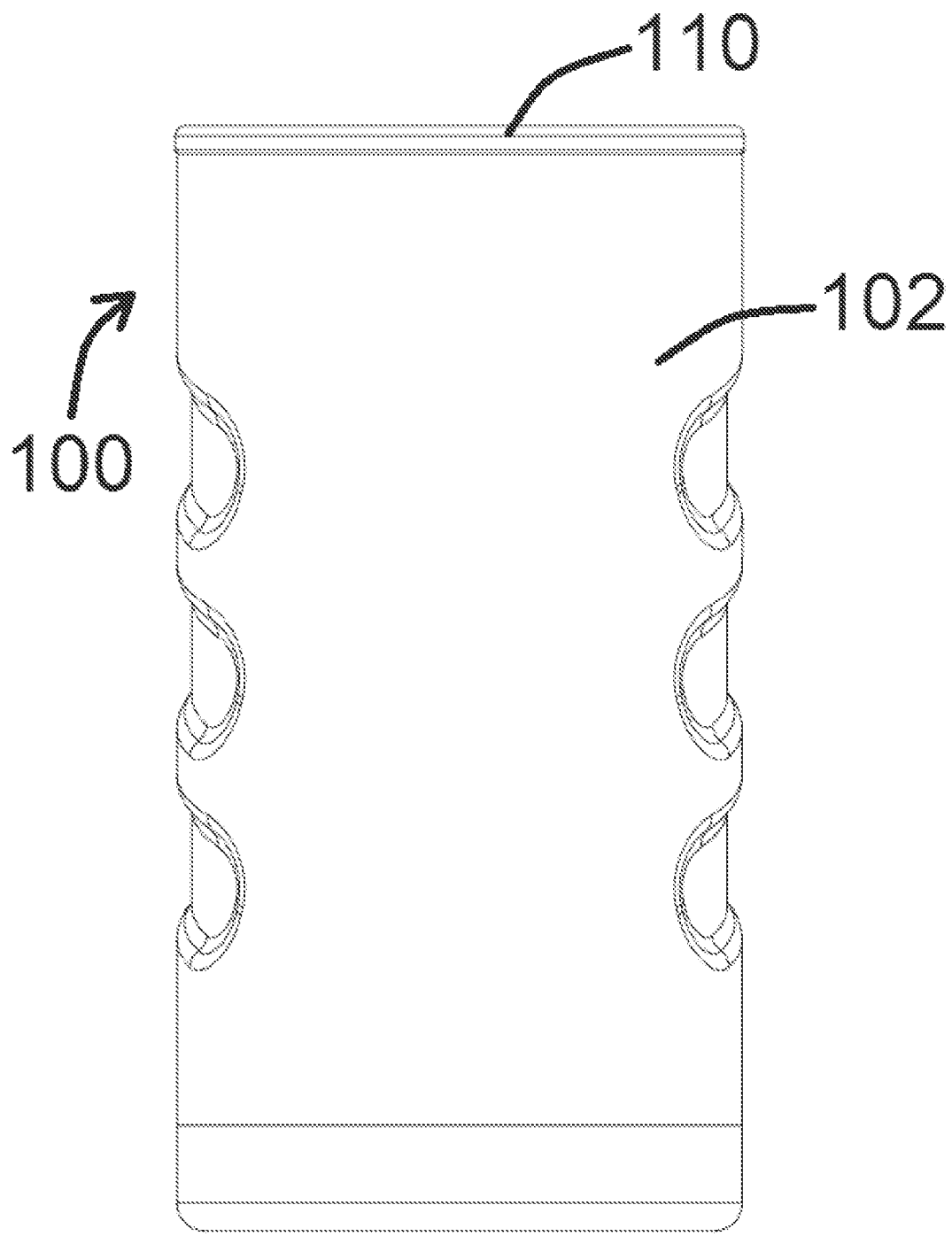

Lids 110 of the present disclosure, such as shown in FIG. 12, may comprise a tab 1200 extending laterally from the remainder of lid 110, so that tab 1200 extends beyond outer wall 202 of container. Tab 1200 therefore can be engaged by a user to facilitate removal of lid 110 from container 102 as may be desired. FIG. 13 shows another relative side view of an exemplary system 100 of the present disclosure, comprising a container 102 with a lid 110 positioned at least partially therein, noting that container 102 and lid 110 are rotated 90° from one another as depicted in FIG. 12 to FIG. 13. Tab 1200 is not readily seen in FIG. 13, as exemplary lids 110 may have one (or more) tabs 1200, and may not be visible from all profile views.

Figure 14:
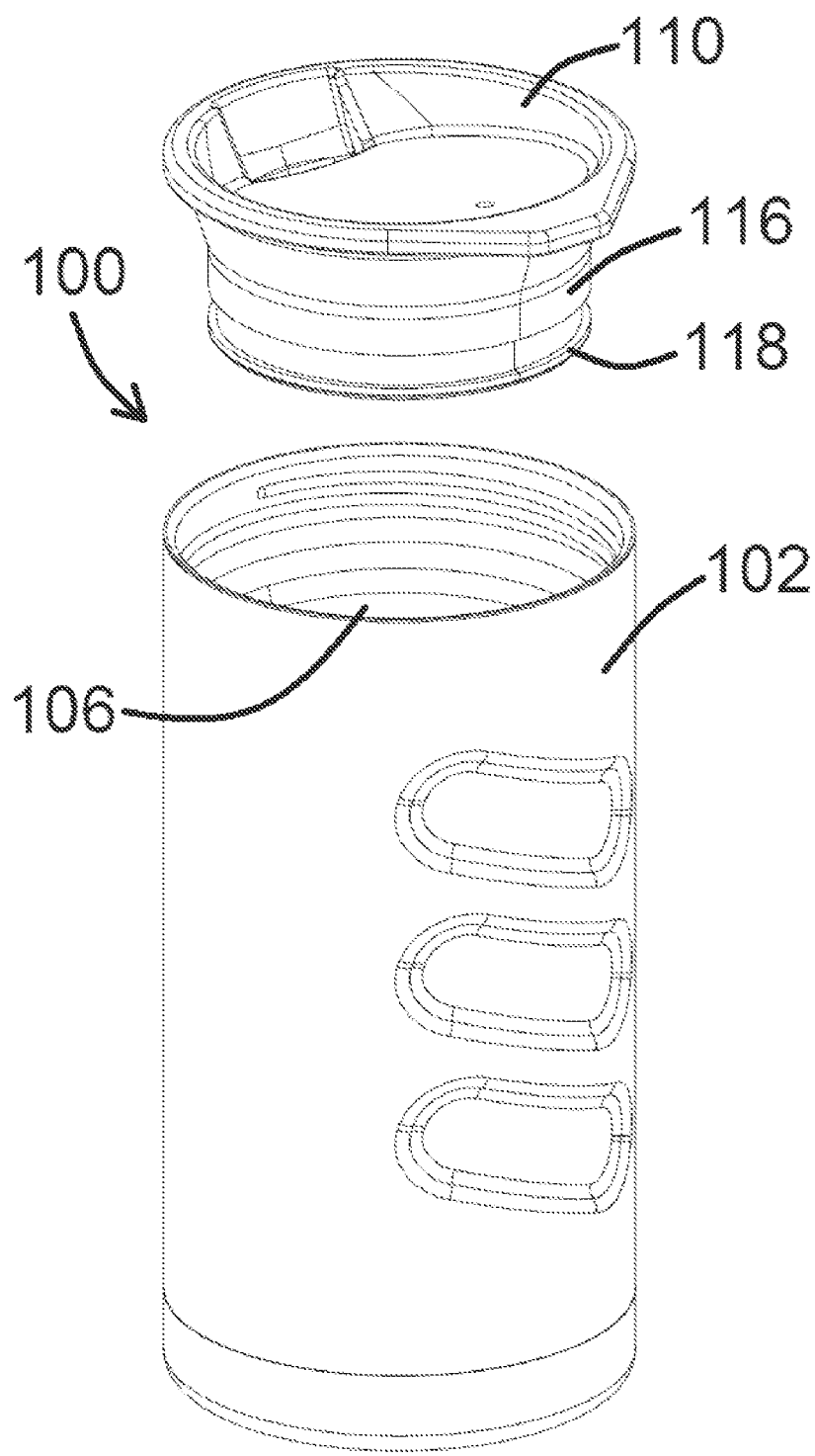
FIG. 14 shows a perspective exploded view of portions of a system, according to an exemplary embodiment of the present disclosure.

FIG. 14 shows a perspective exploded view of portions of a system 100, namely a container 102 and a lid 110, whereby inner wall section 106 of container 102 and seal 118 of extension portion 116 of lid 110. Lid 110 can be positioned upon and pressed into container 102 so to sealably engage container 102.

Figure 15:
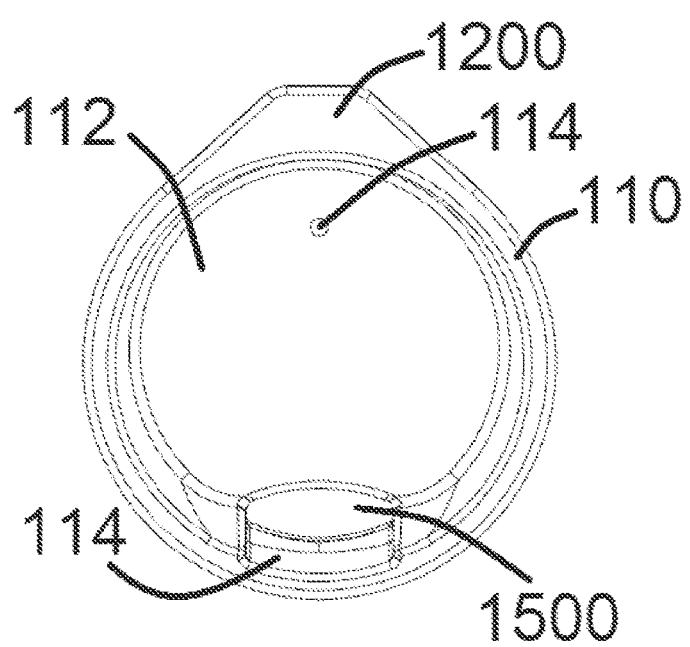
FIG. 15 shows a top view of a lid, according to an exemplary embodiment of the present disclosure.
Figure 16:
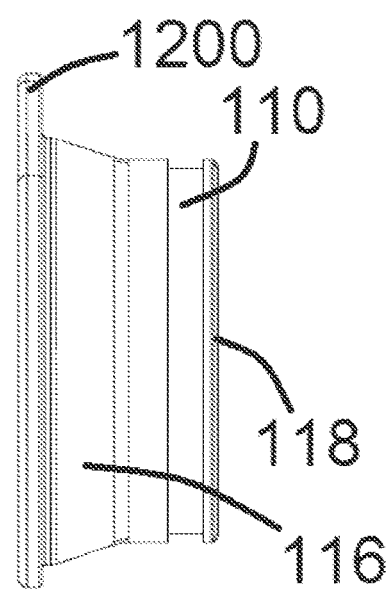
FIG. 16 shows a side view of a lid, according to an exemplary embodiment of the present disclosure.

FIG. 15 shows a top view, and FIG. 16 shows a side view, of an exemplary lid 110 of the present disclosure. As shown in FIG. 15, cover portion 112 can be readily seen, having an aperture 114 used to generally vent container 102, and a second larger aperture 114 used for drinking, namely so that a beverage from within container 102 can pass through said second larger aperture 114 when drinking said beverage. An optional aperture cover 1500, such as shown in FIG. 15, may fully or partially cover the larger aperture 114 so to avoid spills, for example, whereby said aperture cover 1500 can hingedly move or swivel relative to cover portion 112 of lid 110. As shown in FIG. 16, seal 118 of extension portion 116 of lid 110 can be readily seen. When lid 110 is positioned upon container 102, seal 118 of extension portion 116 forms a seal 118 within inner wall section 106 of container 102 to prevent leakage of a beverage from container 102 at said seal 118.

Figure 17:
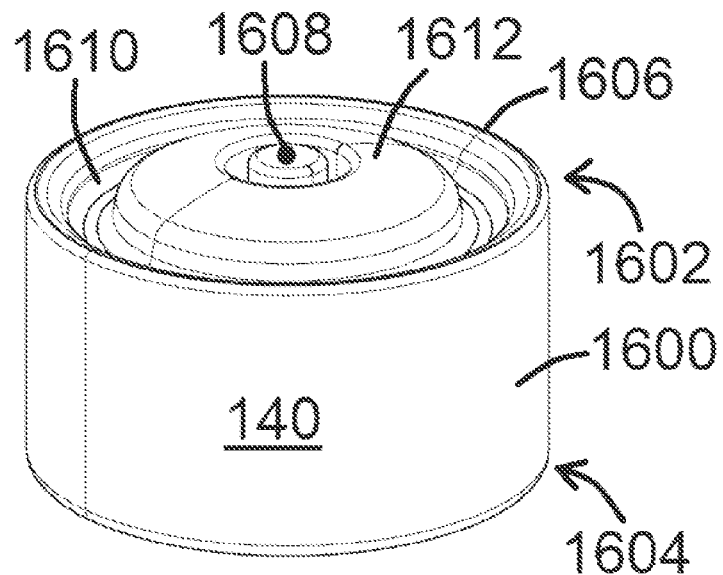
FIG. 17 shows a perspective side view of an adapter, according to an exemplary embodiment of the present disclosure.
Figure 18:
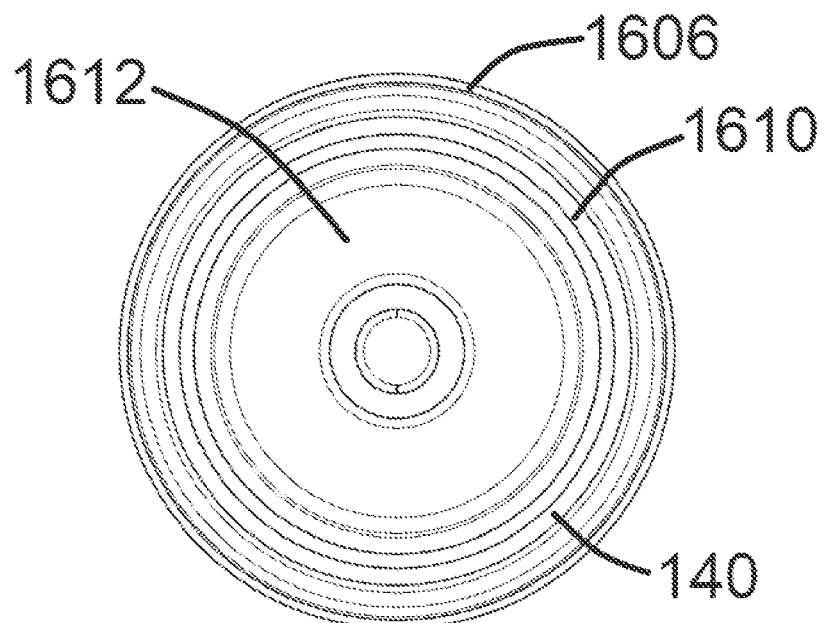
FIG. 18 shows a top view of an adapter, according to an exemplary embodiment of the present disclosure.

As shown in FIG. 1, exemplary systems 100 of the present disclosure may comprise an adapter 140. An exemplary adapter 140, such as shown in the perspective view shown in FIG. 17, may comprise or define a circumferential outer wall 1600 extending from a relative top 1602 to a relative bottom 1604 of said adapter 140. An upper perimeter ridge 1606 may exist at or near relative top 1602 of an exemplary adapter 140 of the present disclosure, transitioning inward toward a relative center 1608 of said adapter 140 and toward the relative bottom 1604, defining a circumferential recessed portion 1610 as shown in FIG. 17. Circumferential recessed portion 1610 may then transition inward toward relative center 1608 and toward the relative top 1602 of said adapter 140, forming a central dome 1612, as shown in FIG. 17. Central dome 1612 can be relatively convex, such as shown in FIG. 17. FIG. 18 shows a top view of an exemplary adapter 140 of the present disclosure, whereby upper perimeter ridge 1606, circumferential recessed portion 1610, and central dome 1612 can be readily seen.

Figure 19:
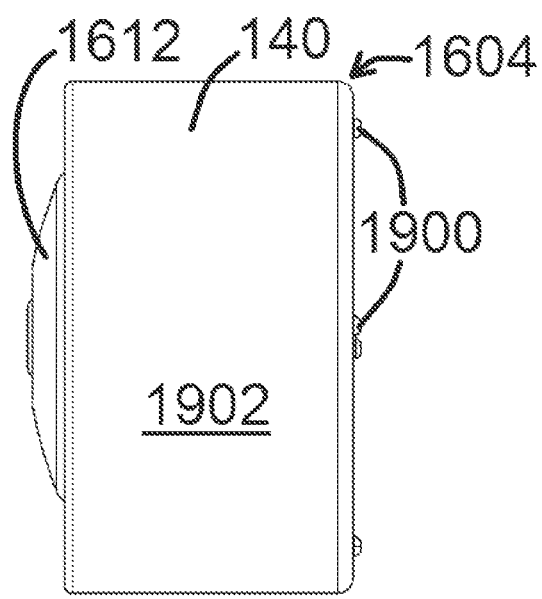
FIG. 19 shows a side view of an adapter, according to an exemplary embodiment of the present disclosure.
Figure 20:
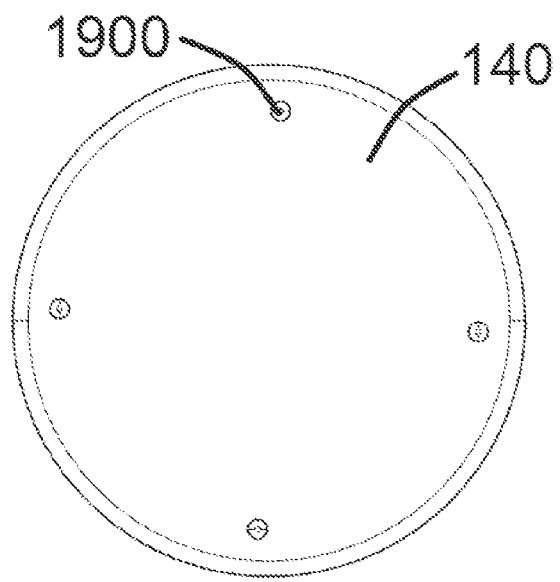
FIG. 20 shows a bottom view of an adapter, according to an exemplary embodiment of the present disclosure.

FIG. 19 shows a side view, and FIG. 20 shows a bottom view, of an exemplary adapter 140 of the present disclosure. As shown in FIGS. 19 and 20, exemplary adapters 140 of the present disclosure can comprise one or more studs 1900 protruding from a relative bottom 1604 of adapter 140, whereby studs 1900, instead of relative bottom 1604, of adapter 140 would contact the bottom of the inside of container 102.

In various embodiments, and such as shown in FIG. 19, exemplary adapters 140 of the present disclosure may have a temperature-sensitive material 1902 included therein, such as a liquid configured to freeze within a standard residential freezer, or a metal configured to cool when placed within a standard residential refrigerator or freezer and maintain a relatively cold state for an hour or more (whereby said temperature-sensitive material has a cooling capacity greater than a cooling capacity of a material of adapter 140 surrounding said temperature-sensitive material). In other embodiments, adapter 140 may comprise metal or another temperature-sensitive material 1902, configured to keep cool over time. Said adapters 140, when cooled and placed within containers 102, are configured to keep a cold beverage cold (such as within a beverage can 2100, as shown in FIG. 21 for example) longer than said beverage would be kept cold without said adapter 140, and are also configured to cool a beverage within a beverage can 2100, depending on the temperature of the beverage when it beverage can 2100 contacts adapter 140.

Furthermore, exemplary adapters 140 of the present disclosure are configured so to generally receive a bottom portion of a standard beverage can. For example, and such as shown in FIG. 21, a relative bottom 2102 of a beverage can 2100 is configured to fit within portions of an exemplary adapter 140, such as within circumferential recessed portion 1610 of adapter 140, so that central dome 1612 of adapter 140 can contact or nearly contact portions of relative bottom 2102 of beverage can 2100. By making such contact or near contact a relatively cold adapter 140 (such as one that was cooled in a refrigerator or freezer) can better maintain a cold state of a beverage within beverage can 2100, or cool a beverage within a beverage can 2100, depending on the temperature of the beverage when it beverage can 2100 contacts adapter 140.

Figure 22:
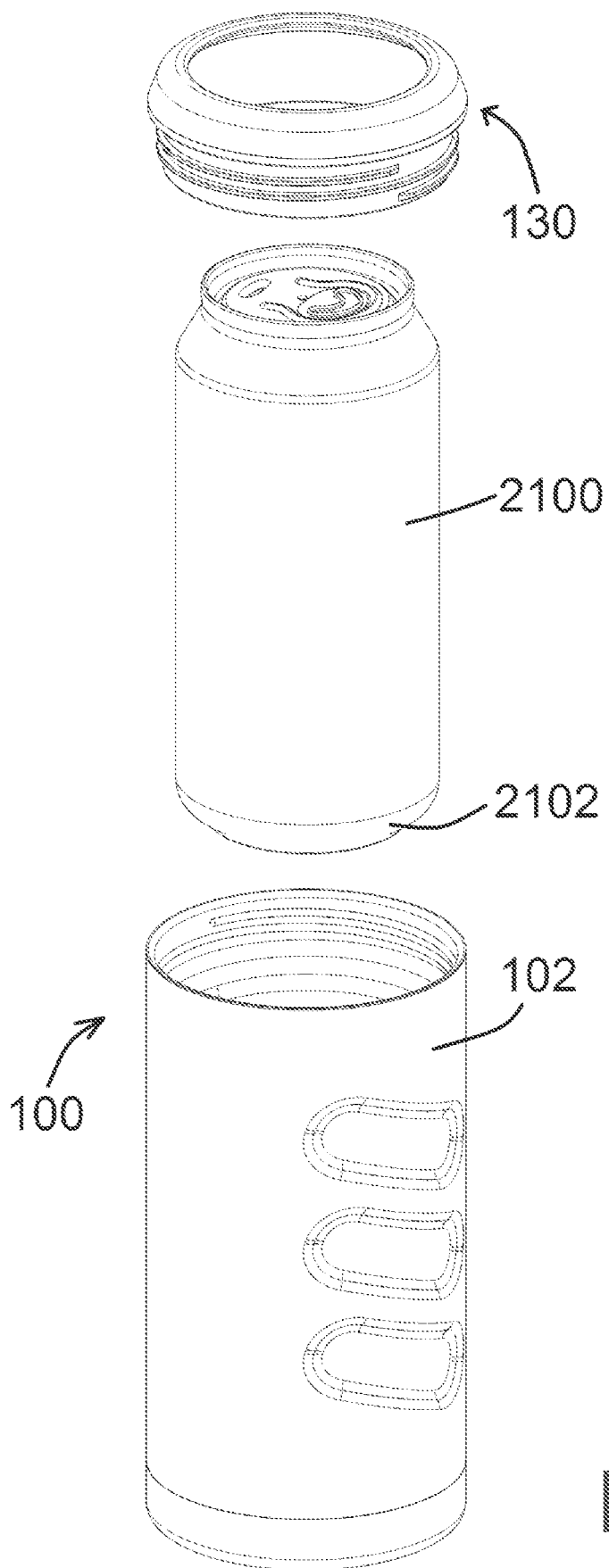
FIG. 22 shows a perspective exploded view of portions of a system without an adapter, according to an exemplary embodiment of the present disclosure.

FIG. 21 shows portions of an exemplary system 100 of the present disclosure. As shown therein, an exemplary system 100 may comprise a container 102, an adapter 140 configured to fit within container 102, and a threaded gasket 130, whereby a threaded gasket 130 is configured to retain a beverage can 2100 when positioned within container and when threaded gasket 130 is coupled to container 102. In such an embodiment, threaded gasket 130 is configured so that beverage can 2100 will not fall out of container 102, even if container 102 were to be inverted, when threaded gasket 130 is coupled to container 102. In at least one embodiment, container 102 and adapter 140 are configured so that when adapter 140 is positioned within container 102, and when beverage can 2100 is positioned within container 102 upon adapter, threaded gasket 130 couples to container 102 and contacts beverage can 2100 so that beverage can 2100 is secured within container. In at least one embodiment, container 102 is configured to contain a standard 12 oz. beverage can 2100 therein when using adapter 140 and coupled with a threaded gasket 130, such as shown in the exploded view of FIG. 21. In at least another embodiment, the same container is configured to contain a standard 16 oz. beverage can 2100 therein, without the use of an adapter 140, when coupled with a threaded gasket, such as shown in the exploded view of FIG. 22.

Figure 23:
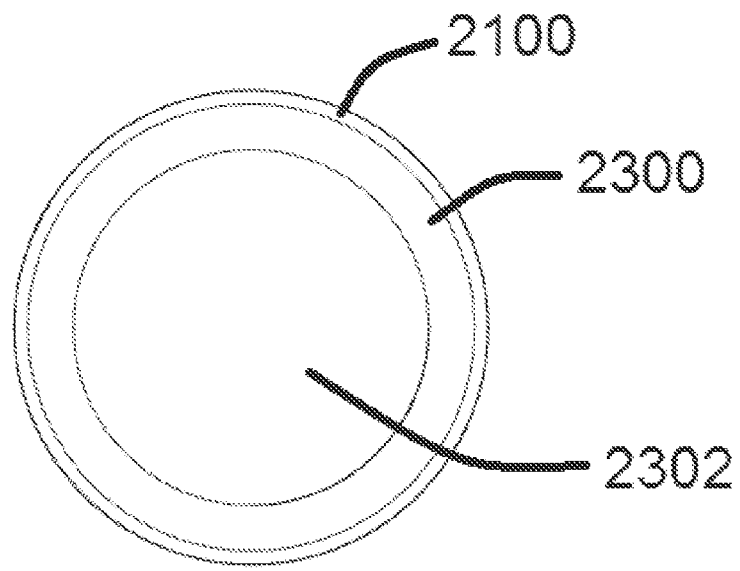
FIG. 23 shows a bottom view of a beverage can, according to an exemplary embodiment of the present disclosure.

FIG. 23 shows a bottom view of a beverage can 2100, as reference herein. As shown therein, a standard beverage can 2100 generally comprises a bottom perimeter ring 2300 surrounding a concave portion 2302. Adapters 140 of the present disclosure, such as shown in FIGS. 17 and 18, can be configured such that circumferential recessed portion 1610 can receive bottom perimeter ring 2300 of beverage can 2100, and such that central dome 1612 of adapter can be received by concave portion 2302 of beverage can 2100, whereby portions of beverage can 2100 contact portions of adapters 140. By doing so, a larger surface area of a relative bottom 2102 of beverage can 2100 can contact or nearly contact a larger surface area of adapter 140, helping to further cool or maintain a cool beverage temperature within beverage can 2100.

Various components of systems 100 of the present disclosure can comprise several types of materials, such as various metals, plastics, rubbers, etc. For example, containers 102 may comprise metal material(s), lids 110 may comprise plastic material(s) and/or metal material(s), threaded gaskets 130 may comprise plastic, metal, and/or rubber materials, and the like.

Figure 24:
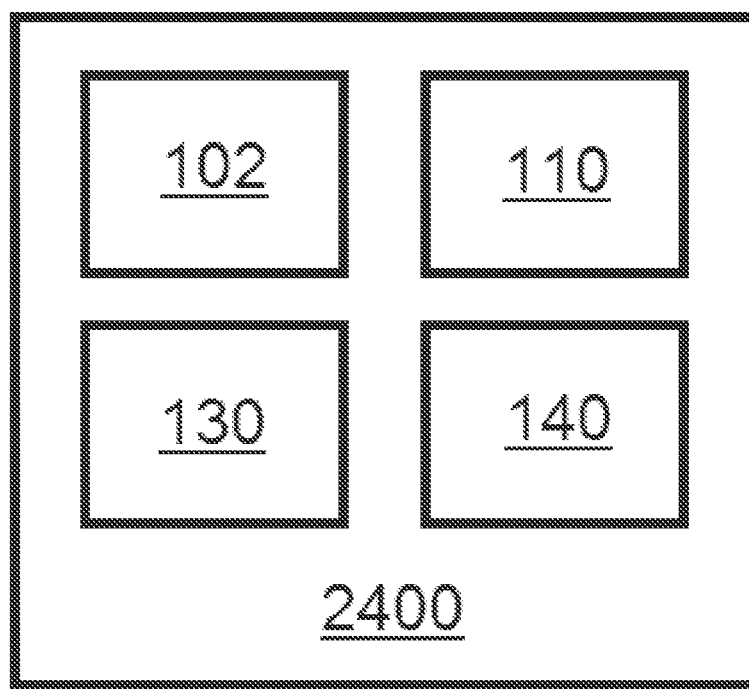
FIG. 24 shows a block component diagram of a kit, according to an exemplary embodiment of the present disclosure.

FIG. 24 shows a block component diagram of an exemplary kit of the present disclosure. As shown therein, an exemplary kit 2400 of the present disclosure may comprise one or more containers 102, one or more lids 110, one or more threaded gaskets 130, and/or one or more adapters 140, so long as at least two components are included, such as one or more of the foregoing.

Figure 25:
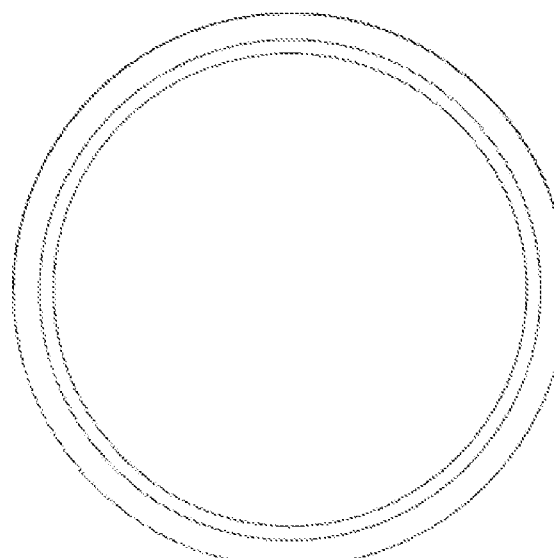
FIG. 25 shows a top view of a threaded element of a threaded gasket, according to an exemplary embodiment of the present disclosure.
Figure 26:
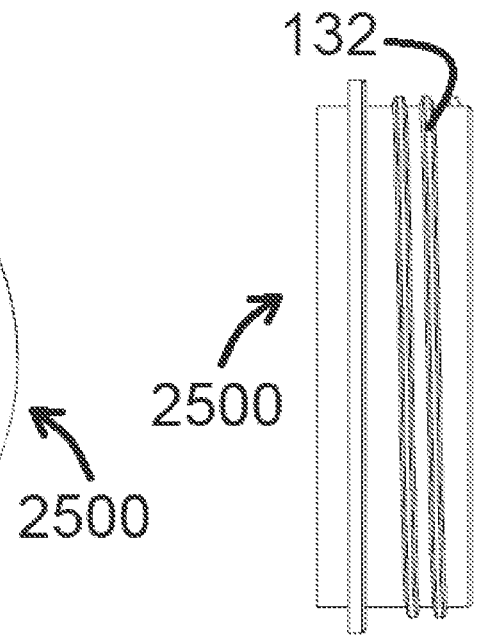
FIG. 26 shows a side view of a threaded element of a threaded gasket, according to an exemplary embodiment of the present disclosure.
Figure 27:
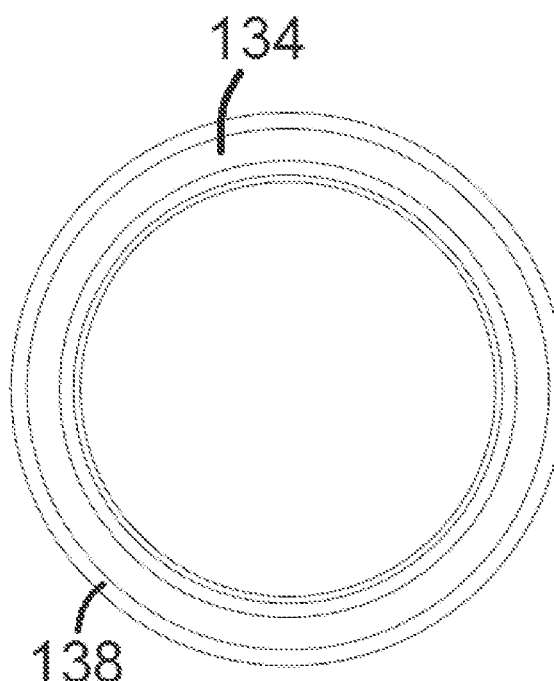
FIG. 27 shows a top view of a curved element of a threaded gasket, according to an exemplary embodiment of the present disclosure.
Figure 28:
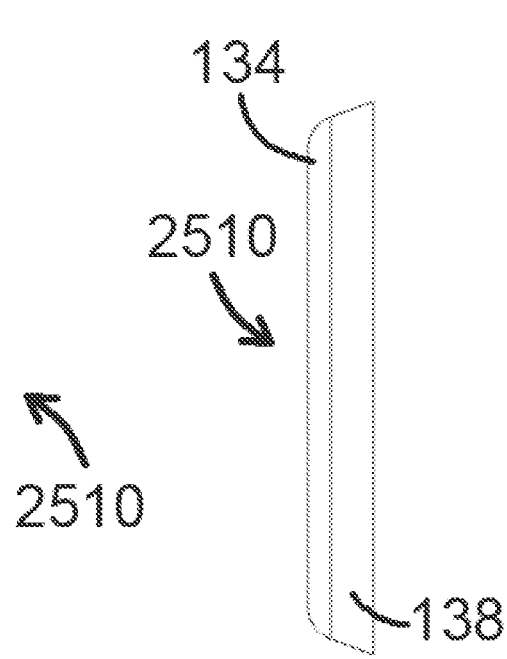
FIG. 28 shows a side view of a curved element of a threaded gasket, according to an exemplary embodiment of the present disclosure.

FIGS. 25, 26, 27, and 28 show portions of exemplary threaded gaskets 130 of the present disclosure. As shown in FIGS. 25 and 26, an exemplary threaded gasket 130 of the present portion can comprise a threaded element 2500, which comprises the threaded portion 132 of threaded gasket. Threaded element 2500 can be configured to receive and engage (couple to) a curved element 2510 of an exemplary threaded gasket 130, as shown in FIGS. 27 and 28. Curved element 2510, in various embodiments, can define the curved profile 134 of threaded gasket 130, as generally referenced herein. Threaded element 2500 and curved element 2510 can comprise different materials, such a threaded element 2500 comprising plastic and curved element 2510 comprising rubber, or the same materials, as may be desired.

While various embodiments of beverage systems and kits and methods to use the same have been described in considerable detail herein, the embodiments are merely offered as non-limiting examples of the disclosure described herein. It will therefore be understood that various changes and modifications may be made, and equivalents may be substituted for elements thereof, without departing from the scope of the present disclosure. The present disclosure is not intended to be exhaustive or limiting with respect to the content thereof.

Further, in describing representative embodiments, the present disclosure may have presented a method and/or a process as a particular sequence of steps. However, to the extent that the method or process does not rely on the particular order of steps set forth therein, the method or process should not be limited to the particular sequence of steps described, as other sequences of steps may be possible. Therefore, the particular order of the steps disclosed herein should not be construed as limitations of the present disclosure. In addition, disclosure directed to a method and/or process should not be limited to the performance of their steps in the order written. Such sequences may be varied and still remain within the scope of the present disclosure.

What is claimed is:

1. An insulated beverage retainment kit, comprising:
   a container having an outer wall and an inner wall that defines an enclosed space there between, the inner wall having an internal threaded section, wherein the enclosed space is vacuum sealed between the inner wall and the outer wall below the internal threaded section, the container further comprising a container opening; and
   a removable gasket having a threaded element and a flange, the flange extending away from the removable gasket further than the threaded element, the threaded element comprising a first material that is threadably-engaged to the internal threaded section of the container such that the flange is contiguous with the container opening, wherein the container is adapted to receive a beverage can at least partially through an opening of the threadably-engaged removable gasket and into the container opening, and a second material of the threadably-engaged removable gasket is adapted to contact at least a portion of the received beverage can so that the received beverage can will not fall out of the container opening when the container is inverted,
   wherein the first material and the second material are different.

2. The kit of claim 1, wherein the internal threaded section is above a non-threaded inner wall section of the container that extends inward toward a relative center of the container further than the internal threaded section of the container.

3. The kit of claim 2, wherein the enclosed space is vacuum sealed between the outer wall and the non-threaded inner wall section.

4. The kit of claim 3, further comprising:
   a grip on the outer wall of the container.

5. The kit of claim 4, the grip comprising at least one transition portion.

6. The kit of claim 4, the grip comprising at least one recessed portion.

7. The kit of claim 3, wherein the removable gasket comprises a curved profile that extends from a relative top of the removable gasket to a relative side of the removable gasket.

8. The kit of claim 7, wherein the beverage can is a 16 oz. beverage can.

9. The kit of claim 7, wherein the beverage can is a 12 oz. beverage can.

10. An insulated beverage retainment kit, comprising:
a container that includes an outer wall and an inner wall that collectively define an enclosed space there between, wherein the enclosed space is vacuum sealed below an internal threaded section of the inner wall; and
a removable gasket having a threaded element and a flange, the flange extending away from the removable gasket further than the threaded element, the threaded element comprising a first material that is threadably-engaged to the internal threaded section of the container such that the flange is contiguous with the container opening, wherein the container is adapted to receive a beverage can at least partially through an opening of the threadably engaged removable gasket and into the container opening, and a second material of the threadably-engaged removable gasket is adapted to contact at least a portion of the received beverage can so that the received beverage can will not fall out of the container opening when the container is inverted,
wherein the first material and the second material are different.

11. The kit of claim 10, wherein a non-threaded inner wall section of the container is below the internal threaded section, the non-threaded inner wall section extending inward toward a relative center of the container further than the internal threaded section.

12. The kit of claim 11, wherein the removable gasket comprises a curved profile that extends from a relative top of the removable gasket to a relative side of the removable gasket.

13. The kit of claim 12, further comprising:
a grip on the outer wall of the container.

14. The kit of claim 13, the grip comprising at least one transition portion.

15. The kit of claim 13, the grip comprising at least one recessed portion.

16. The kit of claim 12, wherein the beverage can is a 16 oz. beverage can.

17. The kit of claim 12, wherein the beverage can is a 12 oz. beverage can.

18. An insulated beverage retainment kit, comprising:
a container having a vacuum-sealed enclosed space between an outer wall of the container and an inner wall of the container and below an internal threaded section of the inner wall; and
a removable gasket having a threaded element and a flange, the flange extending away from the removable gasket further than the threaded element, the threaded element comprising a first material that is threadably-engaged to the internal threaded section of the container such that the flange is contiguous with the container opening, the removable gasket having a curved profile that extends from a relative top of the removable gasket to a relative side of the removable gasket, wherein the container is adapted to receive a beverage can at least partially through an opening of the threadably engaged removable gasket and into the container opening, and a second material of the threadably-engaged removable gasket is adapted to contact at least a portion of the received beverage can so that the received beverage can will not fall out of the container opening when the container is inverted,
wherein the first material and the second material are different.

19. The kit of claim 18, wherein a non-threaded inner wall section of the container is below the internal threaded section, the non-threaded inner wall section extending inward toward a relative center of the container further than the internal threaded section.

20. The kit of claim 19, further comprising:
a grip on the outer wall of the container.

* * * * *